United States Patent
Lord

[19]

[11] Patent Number: 6,093,039
[45] Date of Patent: Jul. 25, 2000

[54] DOCKING DEVICE FOR A PORTABLE COMPUTER

[75] Inventor: Charles Lord, Scottsdale, Ariz.

[73] Assignee: Mobility Electronics, Inc., Scottsdale, Ariz.

[21] Appl. No.: 09/130,054

[22] Filed: Aug. 6, 1998

[51] Int. Cl.[7] .................................................. H01R 13/62
[52] U.S. Cl. ........................ 439/155; 361/686; 439/135; 439/136
[58] Field of Search ................................ 439/155, 159, 439/153, 135–147; 361/686, 683; 364/708.1

[56] References Cited

U.S. PATENT DOCUMENTS

| | | | |
|---|---|---|---|
| D. 356,782 | 3/1995 | Leman | D14/107 |
| D. 359,034 | 6/1995 | Kondo | D14/107 |
| D. 361,758 | 8/1995 | Youens et al. | D14/107 |
| D. 362,241 | 9/1995 | Youens et al. | D14/107 |
| D. 366,034 | 1/1996 | Youens et al. | D14/107 |
| D. 366,469 | 1/1996 | Youens | D14/107 |
| D. 371,119 | 6/1996 | Youens et al. | D14/107 |
| D. 371,769 | 7/1996 | Shima et al. | D14/107 |
| D. 372,901 | 8/1996 | Chu | D14/107 |
| D. 375,945 | 11/1996 | Shin et al. | D14/107 |
| 4,530,066 | 7/1985 | Ohwaki et al. | 364/708 |
| 4,659,159 | 4/1987 | Takahashi | 339/75 M |
| 4,669,053 | 5/1987 | Krenz | 364/708 |
| 4,680,674 | 7/1987 | Moore | 361/395 |
| 4,769,764 | 9/1988 | Levanon | 364/708 |
| 4,788,658 | 11/1988 | Hanebuth | 364/900 |
| 4,939,622 | 7/1990 | Weiss et al. | 361/391 |
| 5,030,128 | 7/1991 | Herron et al. | 439/372 |
| 5,186,646 | 2/1993 | Pederson | 439/374 |
| 5,199,888 | 4/1993 | Condra et al. | 439/136 |
| 5,310,358 | 5/1994 | Johnson et al. | 439/358 |
| 5,313,596 | 5/1994 | Swindler et al. | 395/325 |
| 5,450,271 | 9/1995 | Fukushima et al. | 361/686 |
| 5,477,415 | 12/1995 | Mitcham et al. | 361/686 |
| 5,535,093 | 7/1996 | Noguchi et al. | 361/686 |
| 5,557,562 | 9/1996 | Yoshiharu et al. | 364/708.1 |
| 5,568,359 | 10/1996 | Cavello et al. | 361/686 |
| 5,575,546 | 11/1996 | Radloff | 439/135 |
| 5,580,182 | 12/1996 | Lin | 403/325 |
| 5,608,607 | 3/1997 | Dittmer | 361/686 |
| 5,619,397 | 4/1997 | Honda et al. | 361/686 |
| 5,619,398 | 4/1997 | Harrison et al. | 361/686 |
| 5,642,259 | 6/1997 | Ma | 361/686 |
| 5,673,175 | 9/1997 | Carney et al. | 361/686 |
| 5,684,673 | 11/1997 | Shibasaki et al. | 364/686 |
| 5,691,882 | 11/1997 | Ma | 361/684 |
| 5,692,400 | 12/1997 | Bliven et al. | 70/58 |
| 5,737,541 | 4/1998 | Shimizu et al. | 361/725 |
| 5,822,185 | 10/1998 | Cavello | 361/686 |
| 5,838,539 | 11/1998 | Doss et al. | 361/686 |

FOREIGN PATENT DOCUMENTS

| | | | |
|---|---|---|---|
| 404195507 | 7/1992 | Japan | 361/686 |

*Primary Examiner*—Paula Bradley
*Assistant Examiner*—Tho D. Ta
*Attorney, Agent, or Firm*—Thomas L. Adams, Esq.

[57] ABSTRACT

A docking device can electrically connect to a computer connector located underneath a portable computer in order to communicate with one or more ancillary support devices. The docking device has a case and a docking connector mounted at the case. The case has a housing, and a top panel attached to the housing. The top panel has one or more openings. The top panel is positioned to subjacently support at least a portion of the portable computer. The docking connector is mounted at the case at one of the openings in the top panel. The docking connector is adapted to connect to the computer connector in the portable computer. The docking connector can be located at that one of the panel openings that will be closest to the computer connector when the portable computer lies atop the top panel. The docking device also has an engagement device mounted at the case for engaging the portable computer. The engagement device may have (a) a shaft rotatably mounted in the case, and (b) a pair of implements coupled to the shaft for reciprocation thereby. This docking device can be customized by forming a pattern of panel openings in the top panel that are customized for a specific portable computer, but without customizing the housing itself.

42 Claims, 5 Drawing Sheets

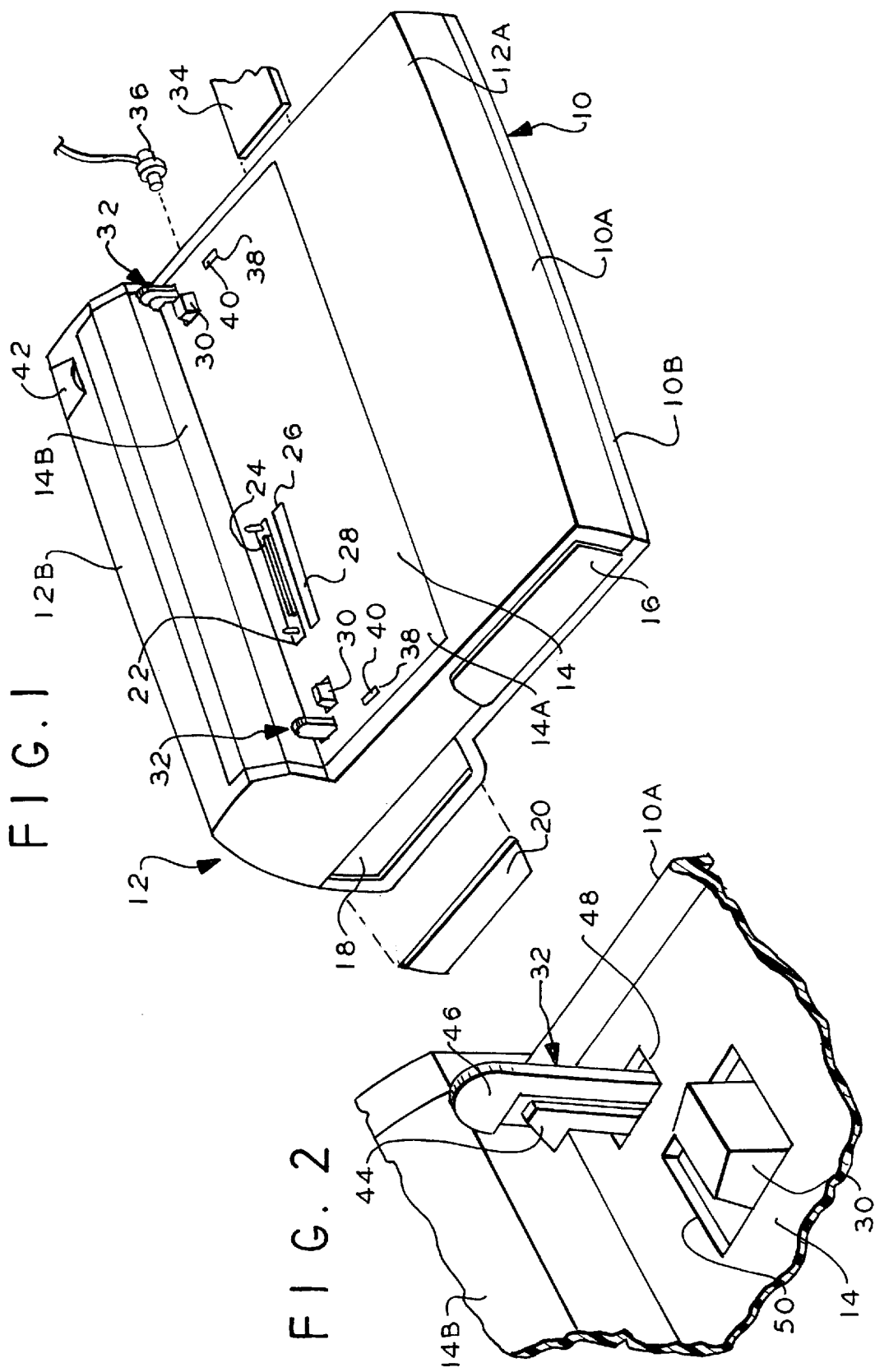

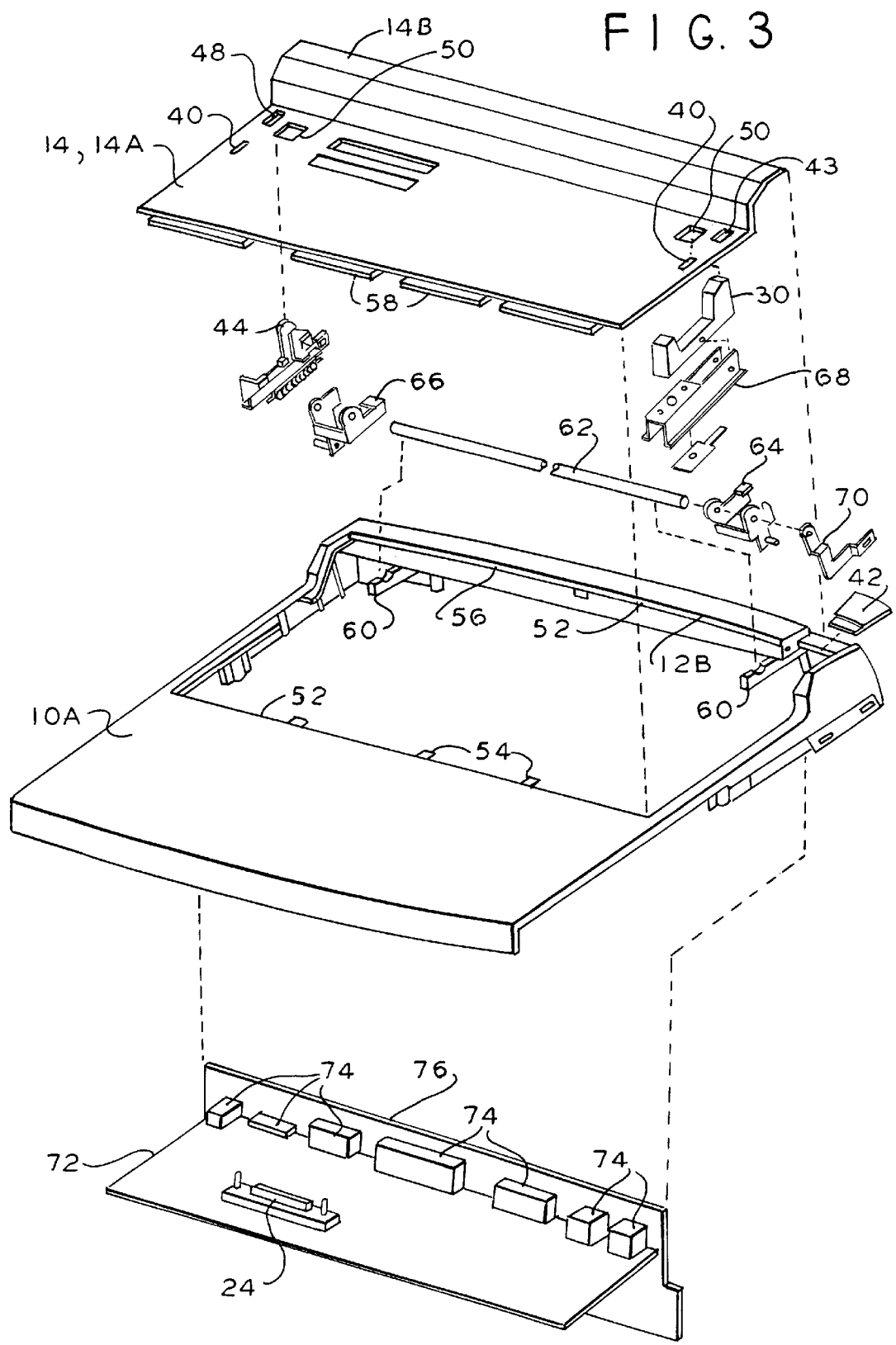

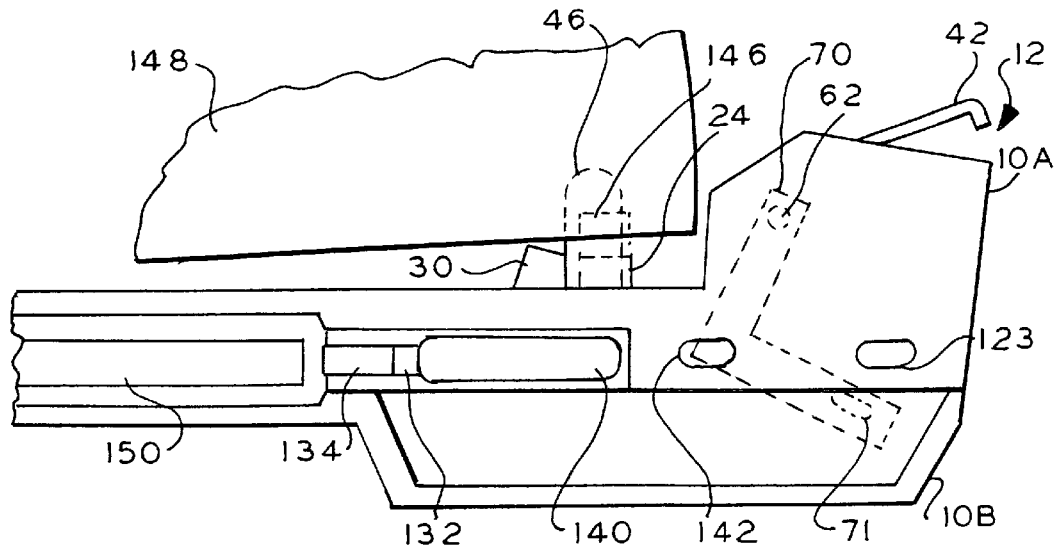
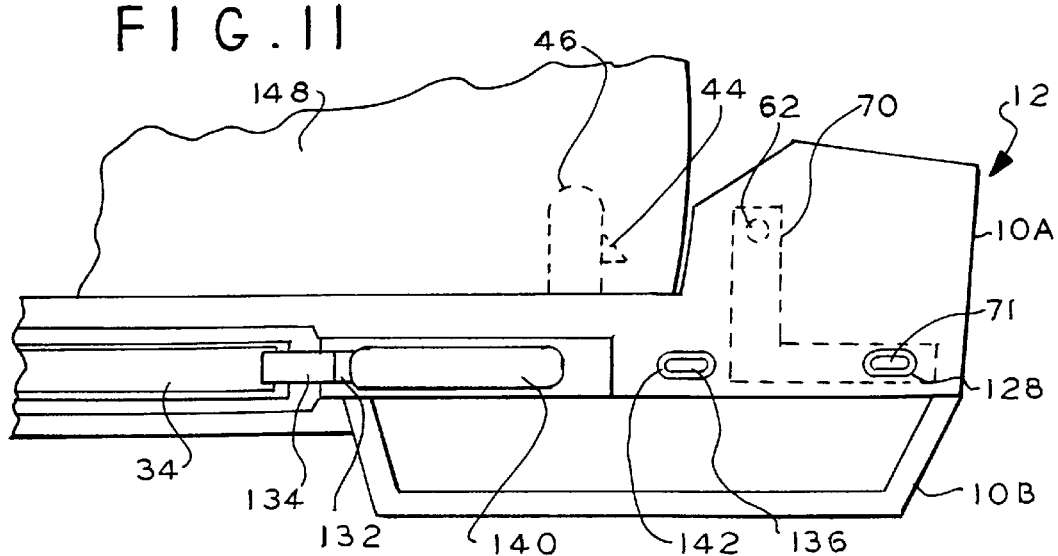
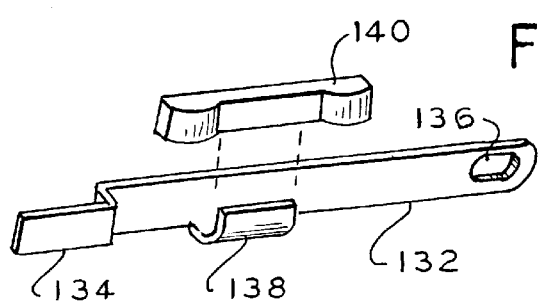

DOCKING DEVICE FOR A PORTABLE COMPUTER

BACKGROUND OF THE INVENTION

1. Field of the Invention

The present invention relates to docking devices that connect to a portable computer in order to communicate with one or more ancillary support devices.

2. Description of Related Art

Electronic equipment has often been housed in rack-mountable cases. These cases have rear connectors that mate with connectors on the rack, to connect the electronics in the case to a larger system.

Various mechanisms are employed for securing the case to the electronic rack. U.S. Pat. No. 4,939,622 shows a general type of rack mounting. In U.S. Pat. No. 4,659,159 a specialized tray has a connector that mates with a connector at the rear of a portable video recorder.

Portable or laptop computers have become popular for personal computing while traveling or for field use. When the user brings the portable computer to a central office, the portable computer is often connected to a local area network and other peripheral devices. The ancillary support devices can include in addition to the local area network, additional drives (hard drives, floppy disk, CD ROM), printers, a CRT display, various multimedia devices, etc. A difficulty with connecting a portable computer to such ancillary support devices is the large amount of time taken to connect these diverse devices and to match the appropriate connector with a connector at the back of the portable computer.

An example of a docking module for accomplishing these tasks can be found in U.S. patent application Ser. No. 08/555,301, filed Nov. 8, 1995 U.S. Pat. No. 5,838,539. This reference shows in some embodiments a housing with a front plate that can be customized for specific portable computers. This front plate can have additional openings through which various implements can reciprocate. These implements may include a stud to push the portable computer out of engagement with the docking module. A guide wall can be integrated with the pushing studs to facilitate engagement of the portable computer with the docking module. Alternatively, a hook-like catch can reciprocate through the front panel and mate with a hole in the underside of the portable computer. Thus the portable computer can be held by this catch and can be pulled inwardly to connect with the docking module. A transverse bar inside the module can extend across the width of the module to support the implements and enable them to reach opposite sides of the portable computer. This transverse bar is reciprocated by a cam plate driven by an integral radial arm that extends through an opening on the side of the docking module. Also in that embodiment, the cam plate can have an additional camming surface to drive a sliding deck (with or without studs or a rail for engaging the portable computer). The sliding deck serves as a platform on which the portable computer can rest. While highly adaptable to various portable computers, this docking module uses a specific mechanism for driving the implements. Also this module is not designed to immediately accommodate all varieties, for example, portable computers that have connectors on their underside.

U.S. Pat. No. 5,030,128 shows a docking module having a plurality of connectors arranged in a pattern to mate with connectors at the rear of a portable computer. This docking module has a toggle latch for pulling the portable computer onto the module, but lacks a device for pushing the portable computer away from the module. Also, there is no underlying apparatus for guiding the portable computer into the docking module. Thus connecting and disconnecting the portable computer can be difficult. Also the panel on the docking module supporting the connectors that mate with the portable computer appear to be molded or have a relatively complex structure that is not easily manufactured. Thus designs of this type are not easily adapted to a variety of portable computers. See also, U.S. Pat. Nos. 4,769,764; 4,788,658; 5,186,646; 5,477,415; 5,619,397; and 5,568,359.

U.S. Pat. No. 5,557,562 shows a docking device having a pair of hooks 135a and 135b. These hooks are rotated into and out of engagement with a portable computer by operating a lever 133. The specification mentions "shafts" connected to the hooks, but the specific mechanism connecting between the lever 133 and the hooks 135a and b is not disclosed. In particular, the reference does not disclose how a portable computer (or other equipment) connected to the docking device could be locked in place to prevent illicit removal. Also, this reference does not disclose how the body of the docking device might be adapted to accommodate various types of portable computers.

U.S. Pat. No. 5,580,182 shows a device that can be connected to the back of a notebook computer. The computer is pushed and locked onto the hooks 140. The user can later depress the presser 110 to push bar 130, which disengages the hooks 140. This same motion deploys member 120 to push the computer off the connector. Again, this reference does not disclose specific techniques for accommodating a variety of portable computers. Also, this reference does not disclose mechanisms for preventing illicit removal of the computer or an ancillary device that may work with the docking device.

U.S. Pat. No. 5,684,673 shows claws 27 that are driven by the racks 56a and 56b (FIG. 6), which are driven by motor 54. Motion of the racks eventually brings pulley 74 into play to move the sliding housing 36 (FIG. 5). The embodiment of FIGS. 7 and 8 has a bottom connector 40 that can connect with a connector 13 on the underside of the portable computer. Again, this reference does not disclose how the body of the docking device can accommodate a variety of portable computers. Also, the reference does not disclose how the portable computer or other ancillary devices can be locked in place to prevent illicit removal.

U.S. Pat. No. 5,692,400 shows a docking device with levers 72 and 73 for operating ejection pins 58 that can push the portable computer off the docking device. A Kensington lock may be either attached solely to the docking device, or may be connected through the docking device to the portable computer. In the latter position, the Kensington lock prevents movement of the lever 72 to impede disengagement of the portable computer. This reference does not disclose locking ancillary devices in addition to the portable computer. In fact, the mechanism inside the docking device is not described. Again, the reference does not disclose how the body of the docking device can accommodate a variety of portable computers.

U.S. Pat. No. 5,535,093 shows a docking device that can accommodate portable computers of different types. Specifically, a connector 26 can be swung into and out of position by operating the lever 60. The portable computer is carried in tray 28. The tray 28 can be pushed in so the portable computer can engage the selected connector. The lever 42 can be operated to deploy ejection pins 40 a, b and c. This reference shows a device that is rather complicated since it intends to service more than one computer. This reference does not teach how a docking device can be made to accommodate one of a variety of portable computers, remaining dedicated to that computer after the accommodation has been made. Also, this reference does not disclose any locking mechanisms for preventing illicit removal.

U.S. Pat. No. 5,310,358 shows a portable computer with latches on its side (FIG. 1) that can engage hooks on a docking system. In the embodiment of FIG. 8, a case 45 can receive a portable computer 13'. Thereafter, the case and the computer can be pushed down so that connectors on the underside of the computer 13' engage zero insertion force connectors in the lower cage 44. The case 45 can be held in place with latches 51 and 52. Again, this reference does not disclose either mechanisms for preventing illicit removal of equipment, or accommodating the body of the docking device for one of a variety of portable computers.

In U.S. Pat. No. 5,619,398 recesses on a portable computer can click onto latch arms 100. Thereafter, a user can rotate the handle 136 to retract latch arms 100 and to connect the portable computer to the connector on the docking apparatus. Afterward, the user can rotate lever 136 again, to spread the arms 100 and release the portable computer. Also, arm 114 pushes plate 88 out to disengage the portable computer. Again, this reference does not concern itself with illicit removal of equipment or accommodating the body of the docking device for one of a variety of portable computers.

U.S. Pat. No. 5,450,271 shows a docking device where the portable computer slides between parallel rails 8 and where a tab 28 fits into a slot on one of the rails. If the stopper 50 is deployed as shown in FIG. 5 the portable computer cannot be removed. The lock mechanism of FIG. 14 can hold the stopper 50 in either a retracted or deployed position. While this reference discloses locking a portable computer in place, it does not disclose preventing illicit removal of other ancillary devices. Furthermore, this reference does not disclose how the docking device can accommodate one of a variety of portable computers.

U.S. Pat. No. 5,313,596 shows in FIG. 6 a laptop tray 108 in a fully retracted position, while FIG. 9 shows the tray in an extended position. When the laptop is being loaded onto the tray, tab 176 is driven back to release latch 142, which can then land into a hole on the underside of the notebook computer. Once positioned and latched, the notebook computer can then be drawn in to mate finally with connector 44a (FIG. 6). For unloading, the rear wall 114 of the tray can later act to push the notebook computer away from the connector 44a when the tray 108 moves out. Again, this reference does not concern itself with illicit removal of equipment or accommodating the body of the docking device for one of a variety of portable computers.

U.S. Pat. No. 5,673,175 shows a door with a swinging latch mechanism that can hold the metal bracket on expansion cards such as PCI cards. U.S. Pat. Nos. 5,608,607; 5,642,259; and 5,691,882 show other specific arrangements for PCMCIA cards.

Various transportable computers that can be adapted with a number of modules, are shown in U.S. Pat. Nos. 4,530,066; 4,669,053; and 4,680,674.

See also the following U.S. Design Patents: D356,782; D359,034; D361,758; D362,241; D366,034; D366,469; D371,119; D371,769; D372,901; and D375,945.

Accordingly, there is a need for an improved docking device that can be adapted to accommodate a large variety of portable computers.

SUMMARY OF THE INVENTION

In accordance with the illustrative embodiments demonstrating features and advantages of the present invention, there is provided a docking device for electrically connecting to a computer connector located underneath a portable computer in order to communicate with one or more ancillary support devices. The docking device has a case and a docking connector mounted at the case. The case has a housing, and a top panel attached to the housing. The top panel has one or more openings. The top panel is positioned to subjacently support at least a portion of the portable computer. The docking connector is mounted at the case at one of the openings in the top panel. The docking connector is adapted to connect to the computer connector in the portable computer. The docking device also has an engagement means mounted at the case for engaging the portable computer.

In accordance with another aspect of the present invention, there is provided a docking device for electrically connecting to a computer connector located on a portable computer in order to communicate with one or more ancillary support devices. The docking device has a case and a docking connector mounted at the case. The docking connector is adapted to connect to the computer connector in the portable computer. The docking device also has an engagement means mounted in the case for engaging the portable computer. The engagement means has (a) a shaft rotatably mounted in the case, and (b) a pair of implements coupled to the shaft for reciprocation thereby.

In accordance with still another aspect of the invention, a method is provided for customizing a docking device having a docking connector at a top panel attached to a housing. The method is performed in order to accommodate a specific portable computer having a computer connector. The method includes the step of forming a pattern of panel openings in the top panel that are customized for the specific portable computer without customizing the housing. Another step is locating the docking connector at that one of the panel openings that will be closest to the computer connector when the portable computer lies atop the top panel.

By employing apparatus and methods of the foregoing type, an improved docking device can be achieved. In a preferred embodiment, the docking device has a housing that is fitted with a top panel. This top panel can have alternate sites for a docking connector that will be used to mate with a connector on the underside of a portable computer. This top panel can also have alternate sites for implements designed to engage the portable computer. For example, one type of implement can include a stud adjacent a sliding latch, designed to be inserted and latched into a recess on the underside of the portable computer. Another type of implement can include a manually operated rocker, mounted inside the housing adjacent to an opening in the top panel to project through the opening and eject the portable computer from the docking device. By properly configuring the top panel, these implements and the docking connector can be positioned to accommodate a specific portable computer, without the need to modify the rest of the housing of the docking device. Preferably, the top panel can be configured by selecting certain inserts for the mold that makes the top panel.

In this preferred embodiment, the above mentioned implements can be operated by a shaft rotatably mounted within the docking device. This shaft can be rotated by a manually operated lever located on the outside of a docking device. This shaft can support a number of internal assemblies with arms that will engage and operate the various implements mentioned above. These assemblies can be customized to accommodate the specific implements that are being used for a specific portable computer. Thus the arm assemblies may be dedicated to a specific portable computer, but the rest of the mechanism used to support and drive the shaft need not be customized to accommodate that portable computer.

In a highly preferred embodiment, this shaft supports a locking arm having a lock hole at one end. With the shaft in a neutral position, this lock hole aligns with a hole in the side of the docking device to receive a removable, tethered locking device; for example, a Kensington lock. This locking device can prevent rotation of the shaft, so that the above mentioned implements cannot be operated and the portable computer cannot be illicitly removed from the docking device.

In this lockable embodiment, a portal on the side of the docking device can receive an ancillary support device, such as a PC card (complying with the PCMCIA standard). A slidable member can be slid over the portal to lock the ancillary support device into position. When in the locked position, a lock aperture on one end of the slidable member aligns with another hole in the side of the docking device to receive the previously mentioned locking device. This allows the slidable member to be locked in place to prevent illicit removal of the ancillary support device. Preferably, insertion of the locking device through the slidable member brings the locking device into an abutting relationship with the previously mentioned locking arm to prevent rotation thereof. Thus the portable computer and the ancillary support device are both locked to prevent illicit removal.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is an axonometric view of a docking device in accordance with principles of the present invention;

FIG. 2 is a detailed, axonometric view of the engagement means of FIG. 1;

FIG. 3 is an exploded, axonometric view of some of the major components of the docking device of FIG. 1;

FIG. 10 is a detailed, exploded, axonometric view of a manually engageable member that is slidably mounted on the side of the docking device of FIG. 1;

FIG. 11 is a right side view of a portion of the docking device of FIG. 1, showing a portable computer latched thereon; and FIG. 12 is a right side view of a portion of the docking device of FIG. 1, showing a portable computer being ejected therefrom.

DETAILED DESCRIPTION OF THE PREFERRED EMBODIMENTS

Figure 4:
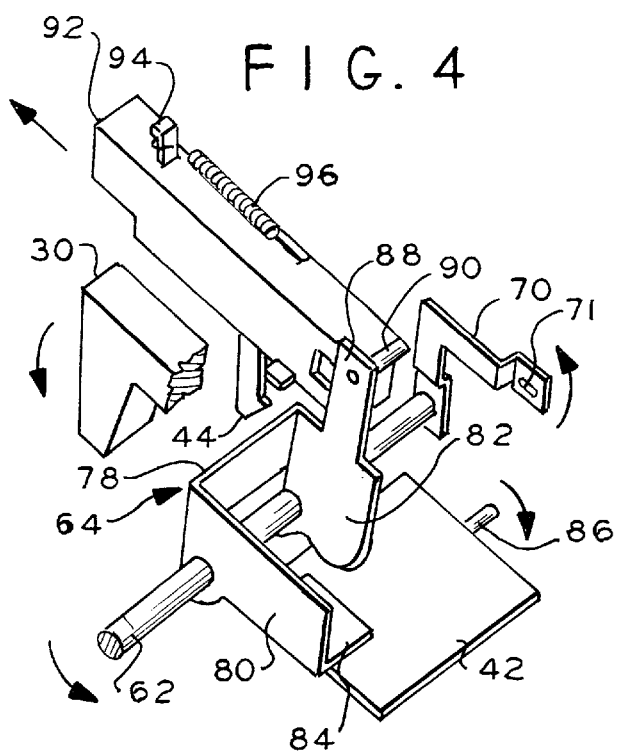
FIG. 4 is a detailed, inverted, fragmentary, axonometric view of portions of the internal mechanism that drives the engagement means of FIGS. 1–3.
Figure 6:
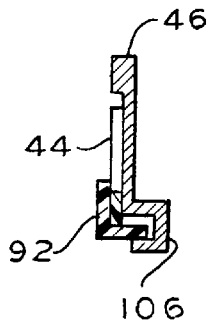
FIG. 6 is a cross-sectional view along line 6—6 of FIG. 5 of portions on the latch/stud arrangement.

Referring to FIG. 1, a docking device is shown as a case 12 in the form of a housing 10, composed of an upper shell 10A and lower shell 10B. The upper shell 10A is fitted with a top panel 14. The front portion of case 12 forms with the front portion 14A of top panel 14, a hollow front platform 12A, designed to support a portable computer (shown hereinafter). The rear portion of case 12 rises above platform 12A to form a rear penthouse 12B. Penthouse 12B is formed in part by the rear wall portions 14B of top panel 14, and is designed to act as a rear abutment for a portable computer (not shown) that may be loaded atop the docking device. A lever 42 is pivotally mounted near the right corner of penthouse 12B to operate implements that will be described presently.

The sides of case 12 may be molded with optional portals, such as portal 18. Portal 18 may be fitted with an ancillary support device such as a CD-ROM drive, floppy disk drive, PC card connectors, optional peripheral connectors, and the like. In the embodiments where portal 18 is not needed, it may be covered with a portal closure 20. While this Figure suggests a separate closure, in more practical embodiments, the mold (not shown) forming the case 12 will be fitted with a selected insert that causes portal 18 to be left either open or closed by the molding process. Another optional portal closure 16 is shown adjacent to portal 18 and may also be selectively left open or closed during the molding process by selecting an appropriate molding insert.

Additional portals may be made on the opposite side of case 12. In this embodiment, a portal (to be illustrated hereinafter) on the right side of case 12 has a connector for receiving a PC card 34, herein referred to as a local one of a plurality of ancillary support devices. As will be described further hereinafter, the docking device and/or the ancillary support device 34 can be secured from illicit removal by a removable, tethered, locking device 36, shown herein as a Kensington lock.

The front portion 14A of top panel 14 is shown with two alternate connector sites, one site being actually used by a docking connector 24, which is located at an opening 22 in top panel 14. The other alternate connector site 26 is shown closed by a closure 28. As before, closure 28 can be made during the molding process by selecting an appropriate molding insert that, in this instance, keeps the site closed. In other embodiments, site 26 will be kept open for presenting a docking connector at a different location. In most cases, only one docking connector will be used at a time. It will be appreciated that more than two potential connectors sites may be established and that the connector sites can be in locations different from that illustrated herein.

The ends of a pair of rockers 30 are shown projecting through openings in the top panel 14. As described further hereinafter, rockers 30 do not normally project, but can do so when manually actuated to eject a portable computer.

An engagement means is shown herein as latch/stud arrangements 32 having implements that will be described presently. Arrangements 32 are shown projecting through openings in top panel 14. The illustrated sites for arrangements 32 are just one pair out of two possible pairs of alternate engagement sites. The other pair of engagement sites are shown as sites 38, which are closed by closures 40. Again, these sites can be kept open or closed by using appropriate molding inserts during the molding process. Also, a greater or lesser number of engagement sites may be employed and the sites selected can be positioned differently than those illustrated.

Referring to FIG. 2, the previously mentioned engagement means 32 is shown in further detail protruding through opening 48 in top panel 14. The exposed portion of a latch 44 is a hooked appendage, in the form of a small rectangular bar tipped with a lateral projection shaped as a triangular prism, although other shapes are possible. A stud 46 also protrudes through opening 48 in a position alongside and parallel to latch 44. Stud 46 is shaped as a rectangular tongue with a rounded tip. The side of stud 46 adjacent to latch 44 is partially hollowed to form an alcove occupied by latch 44. Also, previously mentioned rocker 30 is shown protruding through opening 50 in top panel 14.

Referring to FIG. 3, upper shell 10A is shown with an opening encompassed by rim 52. Rim 52 has a plurality of overhanging shelves 54, shown as a number of peripheral tabs. Another shelf 56 is shown along the rim at the edge of the penthouse portion 12B of shell 10A (as well as along the right and left portions of the rim). Shelves 54 and 56 support top panel 14. Top panel 14 has a number of peripheral tabs 58, shown projecting from the front edge of the panel. Tabs 58 are designed to fit under the rim of upper shell 10A in the spaces between the shelves 54. This provides an interdigitated arrangement that keeps the top panel 14 secured to shell 10A.

The rear portion 14B can be secured to shell 10A by screws or the like and will cover the fingers 60. Fingers 60 have rounded notches that are designed to cradle a shaft 62 (shaft also referred to as a rotator). The underside of portion 14B of top panel 14 has bearing surfaces (not shown) that mate with the notched, cradling portions of fingers 60.

Shaft 62 is to be fitted with assemblies 64 and 66, which are stamped metal devices having arms to operate various implements, as will be described presently. Preferably, the apertures of assemblies 64 and 66 will be slid over shaft 62 before the assemblies are welded in place. Also, the aperture of a locking arm 70 is slid into position at the right end of shaft 62 before being secured in position, preferably by welding. Previously mentioned lever 42 will be fitted in the space illustrated at the right corner of the penthouse portion 12B and will be arranged to engage assembly 64 to rotate shaft 62, in a manner to be described presently.

Previously mentioned latch 44 is illustrated as fitting into opening 48 in top panel 14. Also, rocker 30 is shown as a shallow, U-shaped member pivotally mounted in a bracket 68, which is designed to be screwed to the underside of top panel 14 to allow one end of rocker 30 to protrude through opening 50.

A printed circuit board 72 is designed to be attached to the underside of panel 14 by screws or other appropriate means. Preferably, circuit board 72 will be enclosed by a folded shield (not shown), made of cardboard clad with a conductive layer, in order to prevent excessive electromagnetic interference. Circuit board 72 can be etched to have a number of conventional traces. Previously mentioned docking connector 24 is shown connected to board 72, together with a number of ancillary connectors 74. Connectors 74 are designed to connect to various ancillary support devices, such as a monitor, keyboard, mouse, serial device, game device, floppy or hard drive, or a parallel device (for example, a printer). A variety of circuit components, including integrated circuits, can be soldered or otherwise connected to board 72 to perform various forms of signal processing. A back panel 76 is secured to connectors 74 and has matching holes to allow access to those connectors. Back panel 76 is designed to fit in grooves formed in the back of case 12 (FIG. 1).

Referring to FIG. 4, previously mentioned locking arm 70 is shown attached to the end of shaft 62. Arm 70 is shown as an L-shaped stamping, with a lock hole 71 at its outer end. Previously mentioned assembly 64, also shown attached to shaft 62, is a stamped, folded sheet metal device having a cross bar 78 spanning between an inside arm 80 and outside arm 82. Inside arm 80 has a folded tab 84 acting as a drive platform for driving the inside end (broken away in this view) of previously mentioned rocker 30. The corner of outside arm 82 opposite cross bar 78 has a rounded projection positioned to engage one end of previously mentioned lever 42. Accordingly, clockwise (this view) rotation of lever 42 will cause counter-clockwise rotation of arm 82 and shaft 62, thereby rotating rocker 30 in the direction illustrated.

Outside arm 82 has a projection 88 supporting a transverse pin 90 that can be driven against slider 92. Slider 92 has a tang 94 that hooks onto one end of a helical tension spring 96, which tends to bias slider 92 toward pin 90.

Referring to FIGS. 5–8, previously mentioned tang 94 is shown projecting from one face of slider 92. Slider 92 is slidably mounted in channel 106, which has over most of its length a C-shaped cross-section. Channel 106 is attached to top panel 14 by screws or other appropriate fasteners. Stud 46 is integral with channel 106. In one preferred embodiment, channel 106 and stud 46 are integrally cast in metal, although other materials can be used instead.

Channel 106 is formed with an integral hook 108. Spring 96 is attached between hook 108 and tang 94 to bias slider 92 in order to drive its stop 110 against the illustrated shoulder of top panel 14.

The end of slider 92 opposite tang 94 is formed into a five-sided box 102. Slider 92 has a C-shaped mid section forming a channel, for slidably supporting slide 100. A compression spring 98 is inserted between box 102 and slide 100 for driving slide 100 against the abutment 104. Slide 100 is shown integral with previously mentioned latch 44, which is shown as a hooked appendage.

Figure 9:
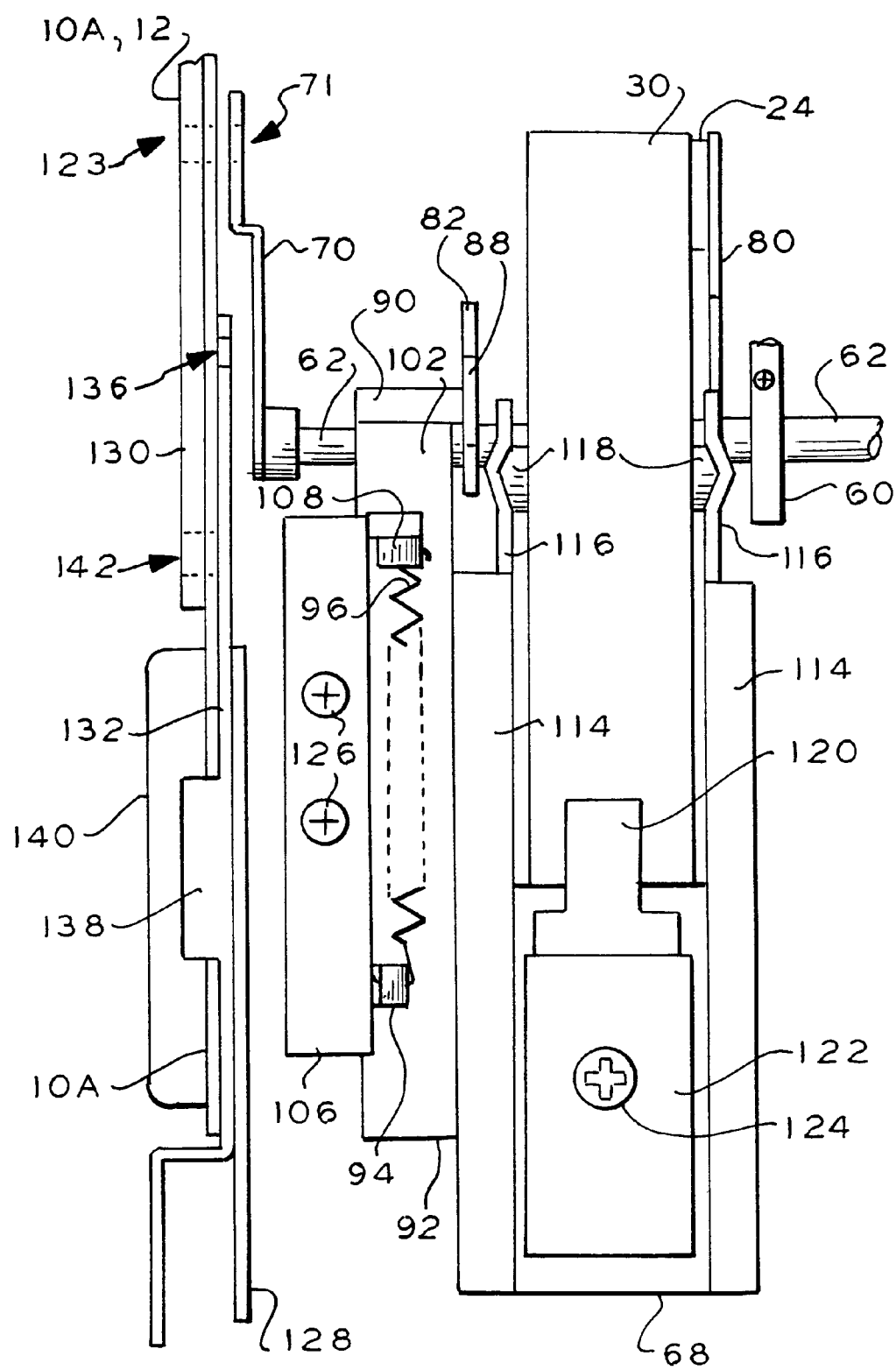
FIG. 9 is a bottom view of the internal mechanism of FIG. 4, including some of its supporting mechanisms and structure.

Referring to FIG. 9, previously mentioned bracket 68 is for the most part a U-shaped channel with a pair of flanges 114. Two sides of bracket 68 extend into a pair of apertured pincers 116 that rotatably support trunnions 118 of rocker 30. A leaf spring 120 overlies one end of rocker 30 to bias it into a retracted position. A backer plate 122 is stacked atop leaf spring 120 and bracket 68, and all are secured to the top panel (panel 14 of FIG. 1) by screw 124.

Previously mentioned channel 106 is shown secured to the top panel by screws 126. Channel 106 slidably supports slider 92 and has a hook 108 that engages spring 96, which pulls tang 94 of slider 92 toward pin 90 on projection 88 of outside arm 82.

Locking arm 70 is shown attached to the end of shaft 62 with its lock hole 71 aligned with the hole 128 formed in the side 130 of the upper shell 10A of case 12. Shell 10A has molded into it an upright wall 128 that is spaced from the main external wall 130 to form a channel in which manually engageable member 132 can slide.

Referring to FIGS. 9 and 10, member 132 is shown as a strip-like, stamped metal member (a) jogged to form a stepped branch 134 at one end, and (b) at the opposite end punched with a lock aperture 136. The mid section of member 132 has a tab 138 curled to form a support blade for knob 140. The underside of knob 140 has a cavity that allows knob 140 to fit onto tab 138. Member 132 a shown positioned in FIG. 9 with its aperture 136 misaligned with a hole 142 formed in the side 130 of upper shell 10A of case 12. As explained further hereinafter, member 132 can be repositioned to bring its aperture 136 into alignment with case hole 142. Also as will be described presently, a locking means including members 70 and 132 will cooperate with the case holes 128 and 142, which provides two spaced sites for a removable locking member.

To facilitate an understanding of the principles associated with the foregoing apparatus, its operation will be briefly described. The docking device can be customized during manufacture by selecting an appropriate pattern of openings in top panel 14. The mold for top panel 14 can be altered with appropriate selectable inserts that can create openings for connectors and implements at any one of a variety of locations. This offers the advantage that only the top panel 14 need be modified and that the shells 10A and 10B can remain the same while still accommodating a variety of portable computers. Also, the arm assemblies 64 and 66 are relatively small components that can be quickly and inexpensively redesigned to accommodate different implements that may be located at different positions. This reduces stocking requirements and allows rapid modification of the design of the docking device as new portable computers are introduced.

A portable computer can be placed atop the platform 12A with the recesses in its underside aligned with the stud/latch arrangements 32. FIG. 2 shows that stud 46 is a rigid metal prong that is strong enough to withstand the insertion forces and to protect latch 44. While rocker 30 is shown protruding in FIGS. 1 and 2, normally it will remain retracted unless manually operated in a manner to be described presently. As the portable computer descends it engages the tapered tip of latch 44, causing it to retract.

Figure 5:
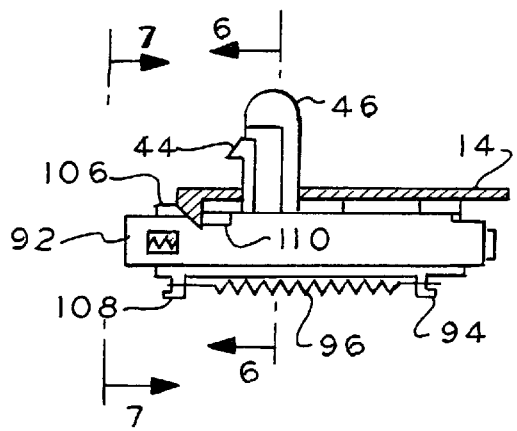
FIG. 5 is a detailed, side view of the latch/stud arrangement of FIGS. 1 and 2, including its internal mechanisms.
Figure 7:
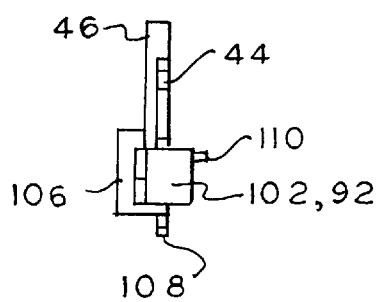
FIG. 7 is an end view taken along line 7—7 of FIG. 5 of portions on the latch/stud arrangement.
Figure 8:
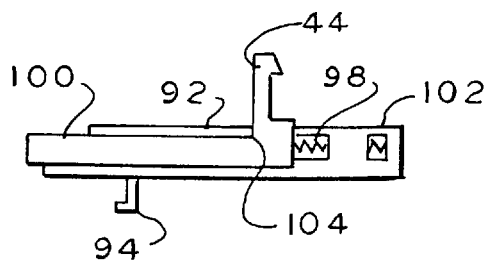
FIG. 8 is a side view of the slider, slide and the hooked appendage of FIG. 5, but viewed from the opposite side.

FIGS. 5 and 8 show that as latch 44 retracts it drives both slide 100 and slider 92 back, causing spring 96 to stretch. As latch 44 fully enters the recess in the portable computer, it eventually reaches a widened region where latch 44, under the urging of spring 96, can again extend and latch onto the portable computer. Also at this time, the computer connector 146 of portable computer 148 (FIG. 12) will mate with previously mentioned docking connector 24. When this process is complete, portable computer 148 will be in the positioned shown in FIG. 11.

At this time, shaft 62 will be in a neutral position and locking arm 70 will be positioned as shown in FIG. 11. Consequently, lock hole 71 will be aligned with the hole 128 in shell 10A of case 12. Accordingly, a locking device (for example, Kensington lock 36 of FIG. 1) can be secured into lock hole 71 to prevent rotation of lock arm 70 and shaft 62. This then prevents retraction of latch 44, so portable computer 148 cannot be illicitly removed.

Alternatively, member 132 can be slid to the locked position shown in FIG. 11 to bring lock aperture 136 in line with hole 142. Then the Kensington lock can be secured in lock aperture 136 to prevent movement of member 132. In this case an ancillary support device, namely PC card 34, has already been connected to a device connector (connector 150 of FIG. 12). The branch 134 of member 132 is shown blocking the removal of device 34 and thereby preventing its illicit removal.

The Kensington lock placed through lock aperture 136 extends inwardly to abut and interfere with clockwise rotation of locking arm 70. Accordingly, shaft 62 and latch 44 cannot be operated and portable computer 148 will be locked into place.

With portable computer 148 loaded on the docking device, connectors 146 and 24 communicate to allow signals to be transferred through board 72 (FIG. 3) to the ancillary connectors 74. In this fashion, the portable computer 148 can be offered various ancillary support devices such as an additional monitor, keyboard, mouse, printer, game device, floppy or hard drive, and the like. Also, circuitry on board 72 can process and condition signals being transferred through the docking device.

If the user wishes to remove the ancillary device 34 (FIG. 11) the locking device can be removed from locking aperture 136 and placed instead in lock hole 71. In this position, lock arm 70 and shaft 62 will not move so that latch 44 keeps portable computer 148 in place. Member 132 can however be retracted so that branch 134 frees device 34, which can then the removed. Member 132 is shown in its retracted position in FIG. 12.

When the user wishes to remove portable computer 148, any locking device at sites 128 or 142 must be removed to allow locking arm 70 and shaft 62 to rotate. Next, the user will lift and rotate lever 42 (FIG. 4), which then rotates inside arm 82 of assembly 64. Consequently, tab 84 pushes rocker 30 to overcome the urging of leaf spring 120 (FIG. 9). Also, extension 88 of outside arm 82 pushes pin 90 against slider 92. Slider 92 then retracts latch 44 to a position within the compass of stud 46. Should latch 44 be retracted too far and hit stud 46, undue force will be relieved by allowing latch 44 and slide 100 (FIG. 8) to stop moving relative to slider 92 as spring 98 yields.

Once latch 44 is fully retracted past any obstruction within the associated recess in portable computer 148, the portable computer will be pushed off case 12 as shown in FIG. 12 due to the pressure from rocker 30. This effectively disconnects the connectors 24 and 146.

It is appreciated that various modifications may be implemented with respect to the above described, preferred embodiment. Thus, the size, shape, and position of the top panel can be altered in various embodiments. Also, various hooks having a variety of shapes can be used instead of the illustrated latch. Furthermore, instead of arm assemblies, the shaft can be fitted with gears, pulleys, or other mechanisms that may be used to operate a variety of implements that interact with a portable computer. In some embodiments, a latch may be attached directly to the shaft instead of being slidably mounted in a separate structure. In addition, a variety of locking means may be employed to engage the mechanisms that may be inside the docking device. While a docking device having a specific shape is illustrated, in other embodiments different shapes may be employed offering different proportions, depending upon the desired capacity, strength, aesthetic considerations, etc. Also, the various illustrated components can be formed of metal, plastic, ceramic or other materials, depending upon the desired strength, rigidity, weight, etc. Furthermore, while certain components were described as being molded, they may be formed in other fashions by stamping, machining, etc.

Obviously, many modifications and variations of the present invention are possible in light of the above teachings. It is therefore to be understood that within the scope of the appended claims, the invention may be practiced otherwise than as specifically described.

I claim:

1. A docking device for electrically connecting to a computer connector located underneath a portable computer in order to communicate with one or more ancillary support devices, said docking device comprising:

a case having (a) a housing, and (b) a top panel attached to said housing, said top panel having a topside, an underside, and one or more openings, said top panel being positioned to subjacently support at least a portion of said portable computer;

a docking connector mounted at said case at one of said openings in said top panel and adapted to connect to said computer connector in said portable computer; and an engagement means attached to and supported on the underside of said ton panel at one of said openings for reciprocating and coercively engaging said portable computer subjacently.

2. A docking device according to claim 1 wherein said top panel is smaller than and distinct from said housing, said housing having a subjacent support surface for subjacently supporting at least a portion of said portable computer, said top panel being attached to said housing adjacent to and substantially coplanar with said subjacent support surface, so that said case is readily adapted without customizing said housing by selecting said top panel with its one or more openings arranged in a pattern that accommodates said portable computer.

3. A docking device according to claim 1 wherein said housing comprises:

an upper and a lower shell, said top panel being attached to said upper shell.

4. A docking device according to claim 1 wherein said housing has a rim with at least one shelf for subjacently supporting at least a portion of said top panel, said top panel having at least one peripheral tab disposed under said rim to latch said top panel to said housing, said peripheral tab and said shelf being located in mutually exclusive regions.

5. A docking device according to claim 1 wherein said housing has a portal and a portal closure at an accessory site, said closure being sized to close said portal, said portal being sized to accommodate one of the ancillary support devices.

6. A docking device according to claim 1 wherein said top panel includes at least two alternate connector sites, one of them being closed by a closure.

7. A docking device according to claim 6 wherein said engagement means is attached to said top panel, said top panel being smaller than and distinct from said housing, so that said case is readily adapted without customizing said housing by selecting said top panel with its one or more openings arranged in a pattern that accommodates said portable computer.

8. A docking device according to claim 1 wherein said top panel includes at least two alternate engagement sites, one of them being closed by a closure.

9. A docking device according to claim 8 wherein said engagement means is manually operable to releasably hold said portable computer on said case.

10. A docking device according to claim 8 wherein said engagement means is manually operable to push said portable computer away from said case.

11. A docking device according to claim 1 comprising:

a circuit board mounted in said case and having at least one ancillary connector, said docking connector being mounted on said circuit board.

12. A docking device according to claim 11 wherein said circuit board is specifically dedicated to said portable computer, so that said circuit board is readily adapted without customizing said housing by selectively positioning said docking connector to accommodate said portable computer.

13. A docking device according to claim 12 wherein said circuit board is attached to said top panel.

14. A docking device according to claim 13 comprising:

a back panel having at least one hole arranged to allow access to said at least one ancillary connector, so that said back panel is readily adapted without customizing said housing by selecting said back panel with its at least one hole arranged to accommodate said ancillary connector and said portable computer.

15. A docking device according to claim 14 wherein said back panel is attached to said at least one ancillary connector.

16. A docking device according to claim 1 wherein said engagement means comprises:

a rotator rotatably mounted in said case.

17. A docking device according to claim 16 comprising:

a lever pivotally mounted on said housing and linked to said rotator, said lever being manually operable to rotate said rotator.

18. A docking device according to claim 16 wherein at least part of said rotator is sandwiched between portions of said housing and said top panel.

19. A docking device according to claim 18 wherein rotator comprises a shaft, and wherein said housing comprises:

a pair of fingers for cradling said shaft.

20. A docking device according to claim 16 wherein said case has a hollow front platform and a rear penthouse, said rotator being mounted in said penthouse.

21. A docking device according to claim 20 comprising:

a lever pivotally mounted under said penthouse and linked to said rotator, said lever being manually operable to rotate said rotator.

22. A docking device according to claim 16 wherein said engagement means comprises:

at least one implement coupled to said rotator to reciprocate in response to oscillation of said rotator.

23. A docking device according to claim 22 wherein said at least one implement comprises:

a rocker for projecting through said top panel in order to detach said portable computer.

24. A docking device according to claim 22 wherein said at least one implement comprises:

a latch for projecting through said top panel in order to latch said portable computer to said case.

25. A docking device according to claim 22 wherein said at least one implement includes a pair of implements, said rotator comprising:

a shaft; and a spaced pair of arms attached to said shaft for actuating said pair of implements.

26. A docking device according to claim 25 wherein said pair of implements comprise:

a pair of rockers for projecting through said top panel in order to detach said portable computer.

27. A docking device according to claim 25 wherein said pair of implements comprise:

a pair of latches for projecting through said top panel in order to latch said portable computer to said case.

28. A docking device according to claim 1 wherein said engagement means comprises:

a rocker for projecting through said top panel in order to detach said portable computer.

29. A docking device according to claim 28 wherein said engagement means comprises:

a bracket attached to said top panel for rotatably supporting said rocker.

30. A docking device according to claim 29 wherein said engagement means comprises:

a lever pivotally mounted on said housing and linked to said rocker, said lever being manually operable to rotate said rocker.

31. A docking device according to claim 1 wherein said engagement means comprises:

a latch mounted to project through said case, said latch being reciprocatable to engage and release said portable computer.

32. A docking device according to claim 31 wherein said latch is attached to said top panel at a selectable position, so that said latch can be arranged to accommodate said portable computer without customizing said housing.

33. A docking device according to claim 31 wherein said engagement means comprises:

a stud affixed to said case alongside said latch, said stud and said latch being adapted for insertion into said portable computer.

34. A docking device according to claim 31 wherein said engagement means comprises:

a channel attached to said top panel, said latch having a slider slidably mounted in said channel, said slider being biased to cause said latch to engage said portable computer.

35. A docking device according to claim 31 wherein said engagement means comprises:

a channel attached to said top panel, said latch comprising:

a slider slidably mounted in said channel, said slider being biased to cause said latch to engage said portable computer;

a slide slidably mounted in said slider and having a hooked appendage for latching onto said portable computer, said slide being biased into a normal position but being displaceable from said normal position if retracted into an obstruction.

36. A docking device for electrically connecting to a computer connector located on a portable computer in order to communicate with one or more ancillary support devices, said docking device comprising:

a case having a hollow front platform with a top panel, and at a higher elevation a rear penthouse;

a docking connector mounted at said case and adapted to connect to said computer connector in said portable computer; and an engagement means mounted in said case for engaging said portable computer, said engagement means having (a) a shaft rotatably mounted in said penthouse at a higher elevation than said front platform, (b) a pair of implements, and (c) a spaced pair of arms attached to said shaft for reciprocating said pair of implements while keeping them at least partially located in said front platform at said top panel at a lower elevation than said penthouse.

37. A docking device according to claim 36 comprising:

a lever pivotally mounted on said case and linked to said shaft, said lever being manually operable to rotate said shaft.

38. A docking device according to claim 36 wherein said at least one implement comprises:

a rocker for projecting through said top panel in order to detach said portable computer.

39. A docking device according to claim 36 wherein said pair of implements each comprises:

a latch for projecting through said case in order to latch said portable computer to said case.

40. A method employing implements for customizing a docking device having a docking connector at a top panel attached to a housing in order to accommodate a specific portable computer having a computer connector, said top panel having a top side and an under side, the method including the steps of:

forming a pattern of panel openings in said top panel that are customized for said specific portable computer without customizing said housing;

locating said docking connector at that one of said panel openings that will be closest to said computer connector when said portable computer lies atop said top panel;

attaching a selected one of said implements, selected to effectively interact with said portable computer, on the underside of said top panel at one of said panel openings; and reciprocating said selected one of said implements to coercively engage said portable computer subjacently.

41. A method for customizing a docking device according to claim 40 wherein said portable computer has a recess, the step of placing the selected one of said implements being performed by positioning the selected one at that one of said panel openings that will be closest to said recess when said portable computer lies atop said top panel.

42. A method for customizing a docking device according to claim 40 employing a mechanism, and comprising the step of:

placing said mechanism at a position that is selected to engage said selected one of said implements.

\* \* \* \* \*

UNITED STATES PATENT AND TRADEMARK OFFICE
CERTIFICATE OF CORRECTION

| | | |
|---|---|---|
| PATENT NO. | : 6,093,039 | Page 1 of 1 |
| APPLICATION NO. | : 09/130054 | |
| DATED | : July 25, 2000 | |
| INVENTOR(S) | : Charles Lord | |

It is certified that error appears in the above-identified patent and that said Letters Patent is hereby corrected as shown below:

Column 11, line 15, after "underside of said", please delete "ton" and insert --top--.

Signed and Sealed this

Twenty-first Day of April, 2009

JOHN DOLL
*Acting Director of the United States Patent and Trademark Office*